Figure 1:
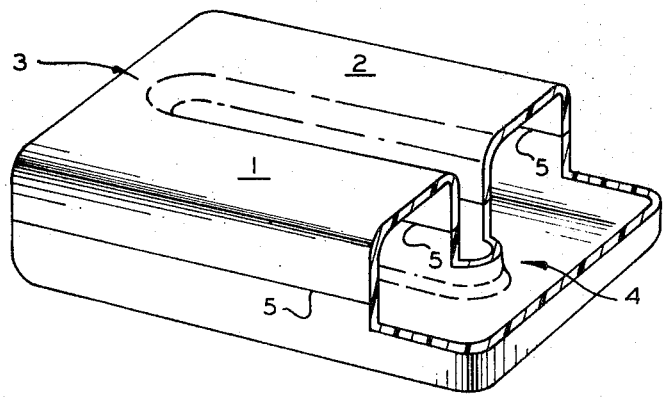

United States Patent

[11] 3,595,422

| [72] | Inventors | Van D. Durrett, Jr. |
|---|---|---|
| | | Bartlesville, Okla.; |
| | | Warren A. Roberts, Kansas City, Mo. |
| [21] | Appl. No. | 845,290 |
| [22] | Filed | July 28, 1969 |
| [45] | Patented | July 27, 1971 |
| [73] | Assignee | Phillips Petroleum Company |

[54] FUEL TANK
4 Claims, 5 Drawing Figs.

[52] U.S. Cl. .................................................. 220/5 A, 220/20
[51] Int. Cl. .................................................. B65d 11/22, B65d 25/04
[50] Field of Search .......................................... 220/20, 4, 5, 5 A

[56] References Cited
FOREIGN PATENTS
273,402  10/1964  Australia ..................... 220/20

Primary Examiner—George E. Lowrance
Attorney—Young and Quigg

ABSTRACT: A plastic fuel tank, preferably for use in motor vehicles, is constructed so as to resist impact loading failure by forming said tank from a plurality of containers and adapting said tank to distribute the energy of impact loading relatively equally throughout the container by adapting the tank to communicate fluid between the containers, and constructing the containers into a substantially rigid unit so as to respond to impact loading as a unit.

PATENTED JUL 27 1971 3,595,422

INVENTORS
V.D. DURRETT, JR
W.A. ROBERTS

BY

*Young & Quigg*

ATTORNEYS

FUEL TANK

This invention relates to a plastic fuel tank of increased resistance to failure on impact loading.

In recent years, the selection of plastic as a material from which fuel tanks, particularly motor vehicle fuel tanks, can be fabricated has received increased interest. Plastic fuel tanks are less expensive than metal tanks, are easier to produce, and are equally resistant as metal containers to the deteriorating effects of gasoline and environment.

Although plastic fuel tanks for motor vehicles are highly desirable, a problem exists in that during impact loading, the plastic tank is more susceptible to failure than the metal tank, particularly when the ratio of surface are to volume is milliseconds Thus, as an illustrated example, if a fuel tank adapted for use in a motor vehicle were constructed in the form of a rectangular solid so it were 8 by 30 by 42 inches, thereby having a high surface area to volume ratio, and filled with 185 pounds of gasoline and caused to translate at 30 miles an hour (44 feet per second), the impact loading is calculated to be about 8,420 pounds resulting from the stopping of the translational motion in 30 milliseconds and the use of the formula $Ft=mV$ where $F$ = pounds of average force, $t$ = time of energy dissipated (30 milliseconds), $m$ = mass (185 pounds/32.2), and $V$ = velocity (44 ft./sec.).

Assuming the impact loading were distributed over the side measuring 8 inches by 30 inches, the pressure can be calculated as follows: $P=F/A=8,420/240=35$ p.s.i. Thus, the total force acting on the side 30 by 42 inches can be calculated as Force $= P \times A$ which equals $35 \times (30 \times 42) = 44,100$ pounds. As can be readily appreciated, impact loading at even the relatively low velocity of 30 miles an hour can create a literally fantastic force (44,100 pounds) on the fuel tank which far exceeds the yield strength of plastic materials.

The prior art teaches that metal gas tanks can be strengthened by the use of posts or braces; however, this teaching is totally unsatisfactory for use in plastic fuel tanks, as the posts or braces do not offer adequate resistance against the phenomenally large forces which can be created on the larger sides. As an example, if the 30 - by 42-inch side were braced with one very large post having a 1 inch square area, then the tensile loading in the post can be calculated as follows: $\sigma=F/A=44,100/1=44,100$ p.s.i. Obviously, the post would fail as the tensile strength generated far exceeds that of the plastic material. Even if 10 posts were used, each with a 1 inch area, the tensile strength would still be 4,410 pounds, assuming equal distribution of load, which also exceeds the yield strength of many plastic materials. Thus, it can be readily seen that although plastic fuel tanks for motor vehicles are highly desirable, the extremely large forces on the larger sides resulting from impact loading will rupture conventional gas tanks and the teachings of the conventional art regarding bracing with posts and supports do not provide a satisfactory solution to the problem.

Broadly, this invention comprises a plastic fuel tank, preferably for motor vehicles, designed to resist impact loading failure and constructed of a plurality of containers and adapted to distribute the energy of impact loading relatively equally among the containers, by adapting the tank to communicate fuel between the containers and constructing the containers into a substantially rigid unit so as to respond to impact loading as a unit.

Thus, through the practice of this invention when the unit is subjected to impact loading the same pressure will be created if the same surface area is subjected to the same impact loading; however, the total pressure on any side will be greatly reduced since the fuel tank comprises a plurality of containers each side of which contains a small area that would be associated with one single tank having the same capacity, or stated another way, through the use of a plurality of interconnecting containers the ratio of surface area to volume has been greatly decreased.

Thus, if the fuel tank 8 inches by 30 inches by 42 inches were to be replaced with a first fuel tank 8 inches by 30 inches by 21 inches connected to a second fuel tank 8 inches by 30 inches by 21 inches so as to provide for fluid communication between the tanks to distribute the impact loading energy and the two tanks were constructed as a substantially rigid unit so as to respond to impact loading as a unit then the force of 8,420 pounds would be distributed over two areas of 30 by 21 inches instead of one area of 30 by 42 inches and, consequently, the total force on the side would be 22,050 pounds instead of 44,100 pounds.

If this total force is still too high then the same volume can be obtained and the total force decreased merely by constructing the tank of additional containers, such as four containers each 8 by 30 by 10.5 inches. Thus, any number of containers can be used as long as the energy of impact loading is capable of being distributed relatively equally to all containers by providing for fluid communication between the containers. Additionally, all such containers must be constructed as a substantially rigid unit in order for the energy of impact loading to be relatively equally distributed among the various containers.

Accordingly, it is an object of this invention to provide a plastic fuel tank of greatly increased resistance to failure due to impact loading.

Additionally, it is an object of this invention to provide a plastic fuel tank for motor vehicles which is substantially safer than other plastic fuel tanks not incorporating the concept of this invention.

Other objects, advantages and features of this invention will be readily apparent to those skilled in the art from the following drawings and appended claims.

The attached figures represent only one embodiment of the invention and other embodiments will be readily apparent to one skilled in the art.

FIG. 1 represents one embodiment of the invention wherein two shells have been joined around a horizontal longitudinal seam in order to provide the plastic fuel tank of this invention.

Figure 2:
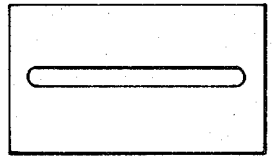

In FIG. 2, there is illustrated a plan view of the fuel tank of FIG. 1.

Figure 3:
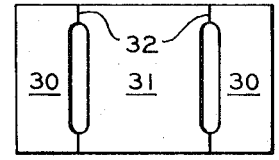

In FIG. 3, there is indicated an alternative construction of the fuel tank of this invention in plan view.

Figure 4:
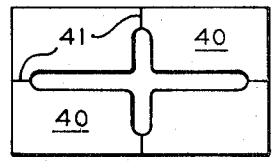

In FIG. 4, there is indicated one still alternative configuration of the fuel tank of this invention in plan view.

Figure 5:
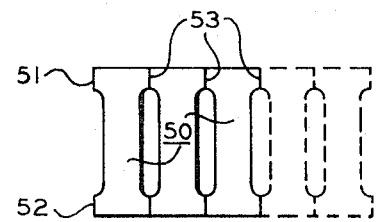

In FIG. 5, there is indicated one still further embodiment of the configuration of the fuel tank of this invention.

The fuel tanks of this invention can be individually molded or molded in assemblable units from a variety of methods known in the art, one of the most satisfactory being that disclosed in U.S. Pat. No. 3,099,043 issued July 30, 1963, to Held.

According to this invention, the fuel tank may be constructed of any plastic material. Hydrocarbon polymer comprises a satisfactory plastic material and, in addition, polymers such as a polyethylene, polypropylene, poly (4-methylpentene-1), copolymers of 2 or more olefins having 2—8 carbon atoms: ethylene-butene-1, ethylene-hexene-1, ethylene-propylene, propylene-butene-1, ethylene-octene-1, proplylene-4-methylpentene-1, and ethylene-propylene-hexene-1 terpolymer, can be used. Suitable fillers, stabilizers, colorants, etc., can also be used.

Referring now to FIG. 1, there is indicated in isometric view one embodiment of this invention wherein two identical shells have been placed together and joined about a longitudinal horizontal seam 5 to provide a fuel tank containing container 1 and container 2 which are adapted to communicate fuel between the two tanks by passageways 3 and 4. As noted, according to this invention, the containers must be constructed as a substantially rigid unit so as to respond to impact loading as a unit and distribute the impact-loading energy relatively equally among the various containers, thus containers 1 and 2 have been joined so as to provide for a substantially rigid unit. If the unit of containers which comprise the tank is not of a substantially rigid character, the invention cannot be practiced as the total impact-loading energy will not be distributed over the entire unit, but instead a proportional amount of the total energy will be distributed over each individual container which comprises the unit of containers. If this happens, although each unit is smaller, the resulting force on the wall will be substantially the same as in the first case if the total energy is divided individually among the units at impact and the individual smaller units are in the same geometric proportions as the one larger unit.

In FIG. 2, there is illustrated a plan view of the fuel tank shown in FIG. 1 in cutaway isometric which further illustrates that containers 1 and 2 have been joined into a substantially rigid unit so as to respond to impact loading as a unit. Although in this embodiment a horizontal seam was used to form the two containers, a vertical seam could have been used or the entire tank molded without seams as one unit.

In FIG. 3, there is indicated another embodiment of the invention wherein a fuel tank may be composed of identical members 30 joined by vertical seams 32 to as many interior members 31 as are required to construct a tank of the desired volume.

Although the containers of this embodiment are joined in a vertical plane, they may be molded as a single unit or joined in a horizontal or other plane as other joining methods are fully within the scope of this invention.

In FIG. 4, there is illustrated still one other embodiment of the invention where four identical containers 40 are joined along vertical seams 41.

In FIG. 5, there is illustrated still one further embodiment of the invention wherein a single unit 50 is joined with other single similar units 50 so as to form a fuel tank of any desired volume. In this embodiment, the ends 51 of outermost member 50 are sealed and the units joined by vertical seams 53 until the unit is complete and the ends are sealed in a similar manner to 51 and 52.

Thus, the invention is broadly applicable to a plastic fuel tank.

Various modifications of this invention can be made in view of the foregoing disclosure and the appended claims without departing from the spirit and scope thereof. Specifically, various configurations of containers can be joined in various ways so as to provide for communication between the containers as long as they are joined so as to comprise a substantially rigid unit so as to respond to impact loading as a unit.

We claim:

1. A composite plastic tank comprising:
   at least first and second plastic shells rigidly attached one to the other forming a substantially rigid, unitary composite blank having a plurality of adjacently positioned containers communicating one with the other through passageways formed at opposed ends of the tank with container walls separating adjacent containers extending across substantially the entire length of the containers and with the volume of each container of the composite tank being of substantially an equal volume relative to other containers of said tank for providing relatively uniform distribution of the energy of impact loading among the containers of said rigid unitary composite tank through the conduction of said energy by fluid communication.

2. The invention of claim 1 wherein said plastic comprises hydrocarbon polymer.

3. A plastic fuel tank for motor vehicles as recited in claim 2 wherein said hydrocarbon polymer comprises polyethylene, polypropylene, poly (4-methylpentene-1), copolymers of 2 or more olefins having 2—8 carbon atoms: ethylene-butens-1, ethylene-hexene-1, ethylene-propylene, propylene-butene-1, ethylene-octene-1, propylene-4-methylpentene-1, and ethylene-propylene-hexene-1 terpolymer.

4. The plastic fuel tank of claim 1 wherein said plurality of containers comprises a first generally rectangular solid container and at least one other generally rectangular solid container, said containers being joined together at opposing end regions so as to provide for fluid communication between said containers and form said containers into a substantially rigid unit.